UNITED STATES PATENT OFFICE.

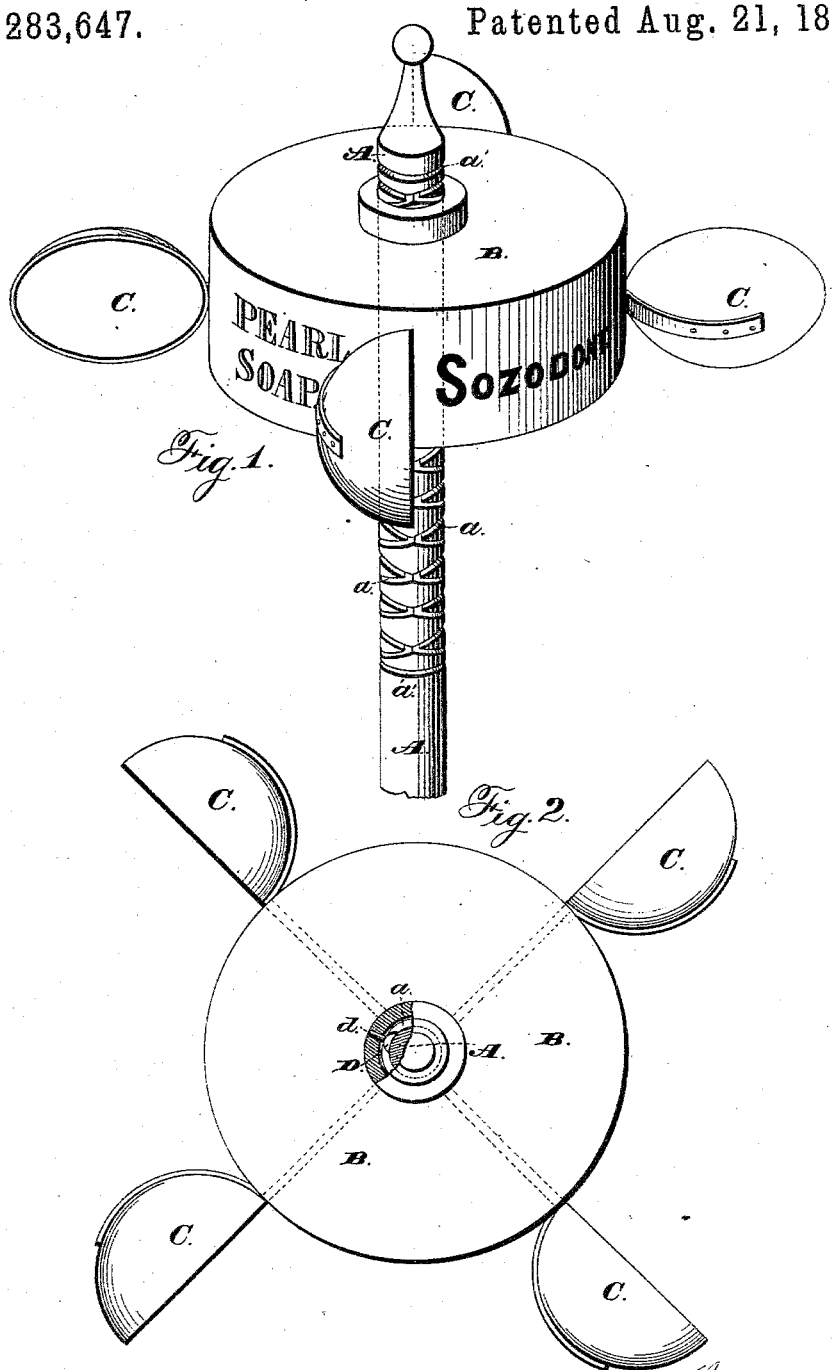

NELSON NEWMAN, OF SPRINGFIELD, ILLINOIS.

SIGN.

SPECIFICATION forming part of Letters Patent No. 283,647, dated August 21, 1883.

Application filed May 10, 1883. (No model.)

*To all whom it may concern:*

Be it known that I, NELSON NEWMAN, of Springfield, in the county of Sangamon, and in the State of Illinois, have invented certain new and useful Improvements in Signs; and I do hereby declare that the following is a full, clear, and exact description thereof, reference being had to the accompanying drawings, making a part of this specification, in which—

Figure 1 is a perspective view of my improved device as arranged for use, and Fig. 2 is a plan view of the upper side of the same.

Letters of like name and kind refer to like parts in each of the figures.

The design of my invention is to present in a novel and attractive form such information as is usually contained by signs; and to this end it consists in a sign adapted to be revolved upon or around a vertical axis and to automatically rise and fall when thus revolving, substantially as hereinafter specified.

In the annexed drawings, A represents a round rod or pole, which is secured in a vertical position, and upon or within its periphery, near its upper end, is provided with two oppositely-inclined spiral grooves, a, that at their ends are united by means of a connecting-groove, a', which follows a circumferential line.

Fitted loosely over the pole A is a drum, B, which is preferably made hollow, and at suitable points around its periphery is provided with radial wings C, that are preferably made cup-shaped to adapt each to catch the wind when its concave side is presented thereto, and to readily move against the same when its convex side is presented.

Within the axial opening of the drum B, preferably at or near its upper end, is a half-nut, D, which is fitted to the groove a, and at its center is provided with a pintle, d, that is journaled radially within said drum and permits said nut to oscillate upon a horizontal axis, so as to follow the direction of said groove.

The post A being set in a conspicuous place, the exterior of the drum B provided with signs, and the wings and other parts painted or otherwise ornamented, the device presents an attractive appearance, and when the wind blows will revolve around said post and by the engagement of the nut D with the groove a will rise until said nut reaches the upper end of the ascending groove, when said nut will enter the descending groove and cause said device to move to the lower limit of its motion, the movements described being continued while there is sufficient wind to cause the parts to operate. By the rotary movement described the signs are successively presented for inspection, while, in consequence of the vertical movements, the whole is made so conspicuous as to attract general attention.

Having thus fully set forth the nature and merits of my invention, what I claim as new is—

A sign adapted to be revolved upon or around a vertical axis and to automatically rise and fall when thus revolving, substantially as specified.

In testimony that I claim the foregoing I have hereunto set my hand this 24th day of March, 1883.

NELSON NEWMAN.

Witnesses:
 GEO. S. PRINDLE,
 HENRY C. HAZARD.